March 10, 1942.　　S. L. GOLDSBOROUGH　　2,276,033
PILOT-CHANNEL PROTECTIVE RELAYING SYSTEM
Filed Sept. 10, 1940
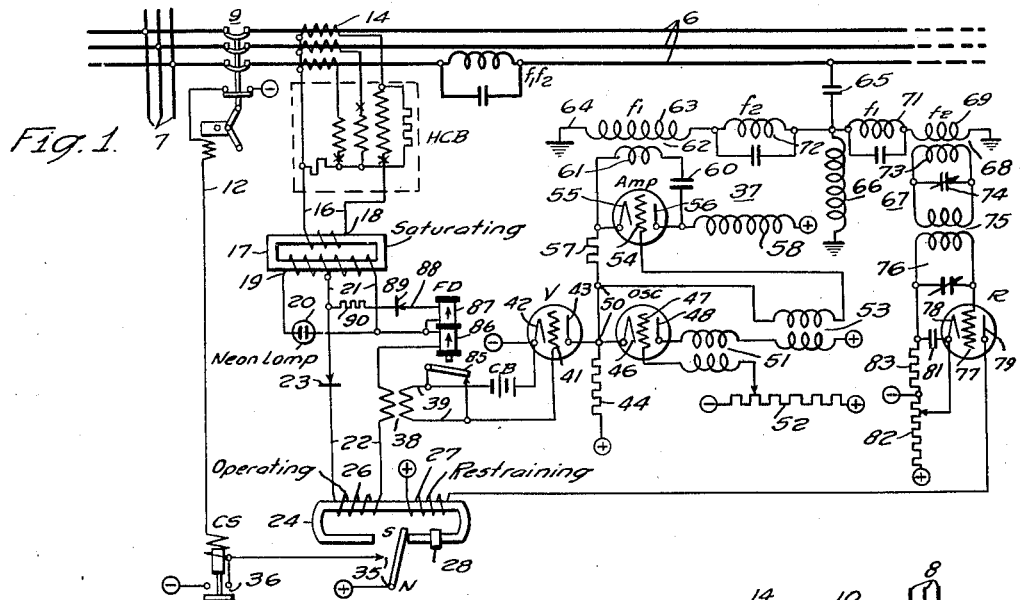
Fig. 1.
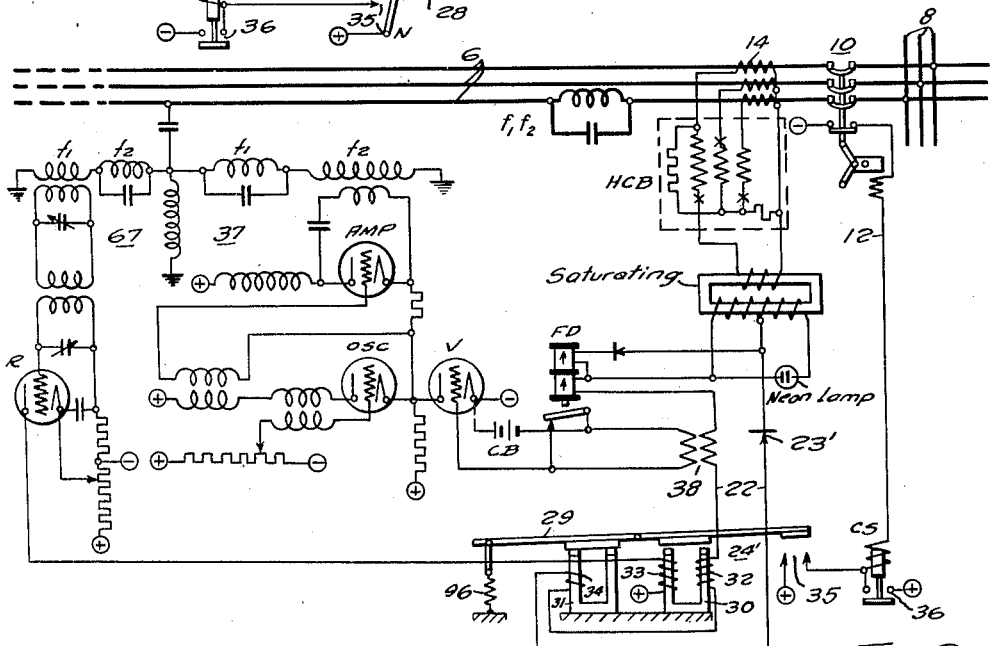
Fig. 2.
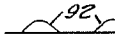
Fig. 3. {Restraining Magnet}
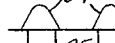
Fig. 4. {Operating Magnet (External Fault)}
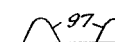
Fig. 5. {Operating Magnet (Internal Fault)}
INVENTOR
Shirley L. Goldsborough.
BY 
ATTORNEY Patented Mar. 10, 1942

2,276,033

UNITED STATES PATENT OFFICE 2,276,033

PILOT-CHANNEL PROTECTIVE RELAYING SYSTEM

Shirley L. Goldsborough, Basking Ridge, N. J., assignor to Westinghouse Electric & Manufacturing Company, East Pittsburgh, Pa., a corporation of Pennsylvania Application September 10, 1940, Serial No. 356,150

40 Claims. (Cl. 175—294)

My invention relates to protective relaying systems such as are employed for protecting transmission-line sections, or other protected electrical apparatus, against faults, and for similar purposes, and it has particular relation to such systems utilizing a pilot-channel or communicating-channel for obtaining a current from some other point in the transmission line for assisting in protecting the line-section against internal faults while blocking or avoiding a line-segregating or sectionalizing operation of a circuit-breaker in the event of a transmission-line fault occurring beyond said other point, by which I mean that, in a current-comparing or other relaying system which makes use of a line-current derived from said other point, a circuit-breaker tripping-operation is blocked or prevented in the event of any external fault outside of the protected line-section or apparatus, without necessarily limiting myself to the case in which the derived "other-point" current is used to prevent or restrain a relay-response. The communicating channel may be either a pair of pilot wires, or a tuned high-frequency carrier-current circuit, or any other means whereby intelligence or a signal-current-change may be communicated from one point to another.

An object of my invention is to provide a protective relaying system which is particularly applicable to the utilization of a communicating channel for protecting a section of a transmission line, but which is not limited to such use, a novel feature of which resides in the production of two unidirectionally pulsating or intermittent relaying-quantities, one responsive to a predetermined current-function in each end or terminal of the protected line-section or protected apparatus, each unidirectionally pulsating relaying-quantity comprising current-impulses which are timed in response to alternate half-cycles of its associated or controlling line-current function at its end or terminal, the intervals between the aforesaid current-impulses being intervals of substantially zero current, and the two unidirectionally pulsating relaying-quantities being made available at a common place to control a single fault-responsive relay which responds differentially with respect to said relaying quantities, or which responds to the relative phases of the two relaying-quantities, or which effects a predetermined relay-actuating operation, in response to one of said relaying-quantity, preferably within less than one-half of a cycle, whenever a current-impulse of said relaying-quantity is not opposed by a corresponding current-impulse of the other relaying-quantity.

Further objects of my invention relate to the utilization of a predetermined phase-sequence function of a polyphase line-current or a polyphase terminal-current of any protected apparatus, and also the utilization of carrier current, and preferably intermittent carrier current, for providing a suitable communicating-channel means for utilizing my invention, in its various aspects, in the protection of a transmission-line section.

A more specific object of my invention is to provide a phase-sequence-responsive pilot-channel protective-means for responding to any one of a plurality of different kinds of fault on a polyphase transmission-line.

With the foregoing and other objects in view, my invention consists in the apparatus, combinations, systems and methods hereinafter described and claimed, and illustrated in the accompanying drawing, wherein:

Figure 1 is a diagrammatic view of very much simplified circuits and apparatus illustrating one form of embodiment of equipment, according to my invention, at one end or terminal of a protected line-section of a three-phase transmission line;

Fig. 2 is a similar diagrammatic view of circuits and apparatus at the other end of the protected line-section, illustrating a different form of fault-responsive relay, and Figs. 3, 4 and 5 are wave-form diagrams illustrating the operation of the form of embodiment of my invention shown in Fig. 2.

In the illustrated forms of embodiment of my invention, the protected apparatus is a section 6 of a three-phase transmission line, said section extending between a bus 7, at the terminal or end shown in Fig. 1, and a bus 8 at the terminal or end shown in Fig. 2. The protected line-section 6 is separable from the other apparatus which is represented by the aforesaid buses 7 and 8 by line-segregating circuit-interrupting means or circuit breakers 9 and 10, respectively, each circuit breaker having a tripping circuit 12 which is effective to cause a line-segregating operation of said circuit breaker.

The protective equipments at the two ends of the protected line-section 6 are commonly substantially identical, so that a description of one will suffice for the other. By way of indicating a certain variant or variation in the means which are utilized for embodying my invention, I have shown the protective apparatus as embodying different types of fault-responsive relays, at the two ends, as will be hereinafter noted in the more detailed description, but otherwise, except for the tuning of the carrier-current circuits, the apparatus at the two ends is identical, and it will be described only once.

At each end of the protected line-section, I provide a bank of current-transformers 14 looking into the protected line-section from the associated bus 7 or 8, that is, the polarities of the line-current transformers 14, at the two ends of the protected line-section, are such that their fault-current responses will be identical in the event of an internal fault within the protected line-section.

Each bank of line-current transformers 14 supplies current to a phase-sequence network HCB which is designed to produce a single-phase relaying-quantity, or voltage, in its output-circuit 16, which attains nearly enough the same magnitude for the same severity (or distance) of a line-fault, regardless of which line-phase is affected by the fault, and regardless of whether the fault is single-phase, polyphase, line-to-line or a ground-fault. There are a number of special responses to phase-sequence combinations which are designed to effect such a result. The particular phase-sequence network HCB which is illustrated in the drawing is a combined positive and zero phase-sequence network which is shown, described and claimed in a patent to Edwin L. Harder, No. 2,183,646, granted December 19, 1939, and assigned to the Westinghouse Electric & Manufacturing Company.

In addition to having the relaying-quantity approximately, or nearly enough, equally sensitive to any one of a plurality of different kinds of faults of equal severity, as is the case with respect to the relaying-function which appears in the output-terminal 16 of the HCB network, it is usually desirable, in carrying out my invention, to provide means, also, for in some manner limiting the magnitude of the response to faults of different severities. Thus, the fault-current voltage of the network-output 16 may vary from a minimum value corresponding to slightly more than the full-load rated power-current-flow in the transmission line, to a value which may be 25 times as great, depending upon the severity of the fault. I accordingly show voltage-limiting means, which is illustrated, by way of example, in the form of a saturating transformer 17 having a primary winding 18 which is energized from the network-output 16, and having a secondary winding 19 which is loaded by means of a neon lamp 20 or other voltage-limiting space-current device or equivalent apparatus. The particular voltage-limiting means I have illustrated is shown in the Harder patent and is particularly claimed in a patent of Myron A. Bostwick, No. 2,183,537, granted December 17, 1939, and assigned to the Westinghouse Electric & Manufacturing Company.

The output of the voltage-limiting means 17—20 is obtained from a tapped portion 21 of the secondary winding 19 of the saturating transformer 17. The output-voltage of the output-circuit 21 of the saturating transformer 17 and neon tube 20 is approximately constant after saturating conditions have been reached, that is to say, said voltage does not vary sensitively in response to variations in the magnitude of the line-current. Thus, the fault-current range may be limited to a 2:1 ratio rather than a 25:1 ratio.

The wave-form of the output-voltage delivered by the saturating transformer 17 and neon tube 20 is of an approximately sinusoidal form, for the milder values of fault-currents in the transmission line, but during severe line-fault conditions the output-voltage of the saturating transformer 17 and neon lamp 20 is definitely flat-topped in its nature.

In accordance with my invention, I utilize a local relaying-circuit 22 which includes a half-wave rectifier 23, said circuit being energized from the approximately constant-voltage output-circuit 21 of the saturating transformer 17. The local relaying-circuit 22 is utilized primarily for two purposes, in accordance with my invention. The first use of the local relaying-circuit 22 is to energize the locally responsive coil or circuit of the tripping-relay or fault-responsive relay at that end of the protected line-section. In Fig. 1, the fault-responsive relay is a polarized relay 24 having an operating winding 26, a restraining winding 27, and usually also a short-circuiting washer 28 which properly limits the speed of response of the relay, so that the relay will be responsive in something like a quarter of a cycle, or other desirable operating time, at least less than half a cycle. In Fig. 1, the operating winding 26 is energized from the local relaying-circuit 22.

In the form of embodiment of my invention shown in Fig. 2, the fault-responsive or tripping-relay 24' is illustrated as being of a type utilizing a balanced beam 29 which is operated upon by an operating electromagnetic circuit 30 and a restraining electromagnetic circuit 31, the operating magnet 30 carrying two windings 32 and 33, while the restraining magnet 31 carries a single winding 34. The operating-time of the relay 24' is also designed to be such that the relay will operate in about a quarter of a cycle, more or less as may be desired. In the form of my invention shown in Fig. 2, the coils 32 and 34 are serially connected in the local relaying-circuit 22, to be energized thereby.

In both forms of embodiment of my invention, as shown in both Figs. 1 and 2, the fault-responsive or tripping relay 24 or 24', as the case may be, is provided with make-contacts 35 which are utilized to energize the local tripping-circuit 12 according to a predetermined relay-response which is substantially exclusively responsive to the line-derived relaying-currents at the two ends of the protected line-section so as to be differentially responsive thereto, or responsive when they are in a predetermined manner out of phase with each other. As soon as the tripping-circuit 12 is energized, the relatively light-weight relay-contacts 35 are by-passed by heavier contacts 36 of a serially connected contactor-switch CS, in accordance with the usual practice.

The second important use of each of the local relaying-circuits 22, as shown in both Figs. 1 and 2 of the drawing, is to modulate or control the operation of a high-frequency or carrier-current transmitter, which is indicated, in its entirety, at 37. The transmitter-controlling means, which is responsive to the local relaying-circuit 22, is illustrated as comprising a transformer 38 which is serially connected in said circuit. This transmitter-controlling transformer, or its primary circuit, preferably has such a design that its time-constant causes it to increase its flux at an approximately constant rate during an entire half-cycle of the impressed voltage or magnetizing current, so that its output-voltage will have a substantially flat-topped wave-form.

The secondary, or output, circuit 39 of the transmitter-controlling transformer 38 is utilized to control the potential of a grid 41 of a triode valve V, said grid being normally negatively biased, by means of a C-battery CB, so that the valve V is normally blocked by the C-battery voltage. The triode valve V has, in addition to the grid 41, a cathode 42 and an anode 43. Its cathode 42 is connected to the negative terminal (—) of a suitable B-battery source, such as a stationary-battery, the positive terminal of which is indicated at (+), which positive terminal is connected to the plate or anode 43 of the valve V through a resistor 44. The triode valve V is so designed that its grid 41 must be brought to the same potential as the cathode 42, or to a more positive value, before the plate-circuit of the valve will be conductive, between the plate 43 and the cathode 42. The relative voltages of the transformer 38 and the negatively biasing C-battery CB are so chosen that, when the current in the local relaying-circuit 22 reaches fault-magnitude, the output-circuit 39 of the transformer 38 will have a sufficiently high voltage, during positive half-waves, to overcome the negative bias of the C-battery CB, and to cause the valve V to be conducting so long as its grid 41 remains either at the same potential as its cathode 42, or at a positive potential with respect to said cathode 42.

The valve V is utilized to control the oscillations of an oscillator-tube OSC which is designed to generate high-frequency currents of a carrier-current frequency $f_1$. The oscillator-tube OSC has a cathode 46, a grid 47 and a plate or anode 48. The oscillator-cathode 46 is connected to the anode 43 of the valve V, as indicated at 50. The grid 47 is coupled to the plate-circuit of the plate 48 by means of a coupling transformer 51, and the potential of the grid is normally controlled by a potentiometer 52 which gives it a slight positive potential with respect to the negative battery-terminal (—), said slight positive potential being substantially the voltage-drop which is consumed in the valve V when the latter is conducting. The oscillator-plate 48 is connected to the positive terminal (+) through the grid-coupling transformer 51, and also through an amplifier-coupling transformer 53.

It will be observed that, when the valve V is non-conducting, the oscillator-cathode 46 will be at the same potential as the positive battery-terminal (+), by reason of the connection of the resistor 44 between said positive terminal and the junction-point 50. Under these circumstances, the oscillator OSC gets no plate-voltage and cannot oscillate. As soon as the valve V becomes conducting, the connecting-point 50 is brought almost to the potential of the negative battery-terminal (—), there being only a relatively small voltage-drop within the valve V, and hence the negative end of the plate-circuit of the oscillator OSC is completed through said valve V, from the connecting-point 50 to the negative terminal (—), and the oscillator-tube OSC thereupon begins to operate.

The output of the oscillator-tube OSC is connected, through the amplifier-coupling transformer 53, to the grid 54 of an amplifier-tube AMP which has, in addition to the grid 54, a cathode 55 and an anode 56. The secondary circuit of the amplifier-coupling transformer 53 is connected between the amplifier-grid 54 and the junction-point 50. The amplifier-cathode 55 is connected to said junction-point 50 through a grid-biasing resistor 57. The amplifier-plate 56 is energized from the positive battery-terminal (+) through a choke-coil 58.

The output of the amplifier AMP is derived by means of a tuned circuit comprising a capacitor 60 and the primary winding 61 of a transmitter-coupling transformer 62, said tuned circuit 60—61 being shunted across from the amplifier-plate 56 to the amplifier-cathode 55, and being tuned to the frequency $f_1$ at which the oscillator OSC oscillates. The transmitter-coupling transformer 62 has a secondary winding 63 which is connected between the ground 64 and one of the line-conductors of the protected line-section 6, through a coupling-capacitor 65, said coupling-capacitor being also grounded through a choke-coil 66, as is common practice.

The foregoing description of the transmitter 37, as being tuned to the relatively high frequency, or carrier-current frequency, $f_1$, applies particularly to the end of the line-section shown in Fig. 1. At the other end of the line-section, as shown in Fig. 2, the transmitter 37 is tuned to a different carrier-current frequency $f_2$.

Each terminal equipment comprises also a carrier-current receiving-circuit which is generically indicated at 67, each receiver being tuned to selectively receive carrier-currents of the frequency transmitted from the opposite end of the protected line-section. Each receiver-circuit 67 is connected to the coupling-capacitor 65, at its end of the protected line-section 6, through a receiver-coupling transformer 68, the primary winding 69 of which is connected between ground and the line-connected coupling-capacitor 65. It will usually be desirable to include, in circuit with the primary winding 69 of the receiver-coupling transformer 68, a parallel-resonant wave-trap 71 which is tuned to the frequency of the transmitter 37 at the same station, so as to avoid short-circuiting the transmitted currents through said primary winding 69. In like manner, the primary winding 63 of the transmitter-coupling transformer 62 may be serially connected to a parallel-resonant wave-trap 72 which is tuned to the same frequency as the receiver 67 at the same station, that is to say, at the same frequency as the transmitter at the opposite end of the protective line-section.

The receiver-coupling transformer 68 has a secondary winding 73 which is a part of a tuned circuit including a capacitor 74 which is tuned to the frequency of the receiver-circuit 67. This tuned circuit 73—74 is, in turn, coupled through a transformer 75, to a second tuned circuit 76 which, in turn, is coupled to the grid 77 of a receiver-tube R. The receiver-tube is provided, in addition to the grid 77, with a cathode 78 and a plate or anode 79. The receiver-anode 79 is connected with an anode-circuit which is energized from the positive battery-terminal (+), through the restraining winding 27 in Fig. 1, or through the second winding 33 of the operating magnet 30 in Fig. 2, said second winding 33 being connected in a polarity opposite to that of the first-mentioned operating-winding 32 which is energized from the local relaying-circuit 22 at the line-terminal which is indicated in Fig. 2.

The receiver-cathode 78, as shown in Fig. 1, is coupled to the tuned circuit 76 through a carrier-frequency bypassing capacitor 81, and it is also connected to the negative battery-terminal (—) through a potentiometer 82, which serves to provide a small negative bias for the receiver-grid 77, the biasing circuit of the grid being completed through a resistor 83, which is connected to the negative terminal (—), and thence, through the secondary winding of the coupling-transformer 75, to the grid 77.

The line-conductor to which the carrier-current channel is coupled is also provided, at each end of the protected line-section, with a wave-trap which is indicated at $f_1$ $f_2$, which may be either a double-frequency wave-trap, or, if the two carrier-current frequencies $f_1$ and $f_2$ are sufficiently close together, a single broadly tuned wave-trap may suffice for both frequencies.

In the preferred form of embodiment of my invention, I also provide a sensitive fault-detector FD at each end of the protected line-section, said fault-detector having normally closed back-contacts 85 which normally short-circuit the output-circuit 39 of the transmitter-controlling transformer 38, so that it is not necessary to rely upon the voltage-difference between the circuit 39 and the C-battery CB as a means for controlling the initiation of carrier-current transmission on alternate half-waves of the line-current-responsive relaying quantity which is produced in the output-circuit 21. When the fault-detector FD is utilized, the voltage of the transmitter-starting transformer 38 may be somewhat higher than if the fault-detector were not utilized, with the result that, when the fault-detector finally responds, by opening its back-contacts 85, there will be a material voltage-difference between the transformer-voltage and the C-battery voltage, so that the oscillator OSC will certainly and positively generate high-frequency current during positive half-cycles of the output-circuit 39 of the transmitter-controlling transformer 38.

The fault-detector FD should be responsive to both half-waves of the current delivered by the phase-sequence network HCB, either before or after said current has been limited by the voltage-limiting means 17—20. In the particular form of invention illustrated in the drawing, the fault-detector FD has two operating windings 86 and 87, both energized, in the same polarity, so as to tend to operate the relay, the operating-coil 86 being serially included in the local relaying-circuit 22 which is energized from the output-circuit 21 of the saturating transformer 17 through the half-wave rectifier 23. The other operating-coil 87 of the fault-detector is included in an auxiliary loading-circuit 88 which is also energized from the output-circuit 21 through a half-wave rectifier 89, the two rectifiers 23 and 89 being of such relative polarities that they take opposite half-waves of the output of the circuit 21. A loading-resistance 90 may also be included in the auxiliary circuit 88 so that the two circuits 22 and 28 may be approximately equally loaded.

The operation of my improved protective apparatus will first be described in connection with the particular form of tripping-relay 24' which is shown in Fig. 2. The restraining magnet 31 in Fig. 2 is energized solely by means of the winding 34 which receives its energy from the locally responsive unidirectionally pulsating-current circuit 22, so that said restraining magnet receives a series of unidirectional force-pulsations, during alternate half-waves of the line-current frequency, as indicated at 92 in Fig. 3. The locally energized operating-magnet winding 32 of Fig. 2 is energized from the same local circuit 22 as the restraining-winding 34, so that it receives a series of intermittent unidirectional current-impulses or force-pulsations such as are indicated at 94 in Fig. 4. These pulsations are indicated as being larger than the restraining-magnet pulsations 92, which result is accomplished by having more turns in the operating-winding 32 than in the restraining-winding 34. The wave-form of the pulsations 92 and 94 is illustrated as being substantially sinusoidal, but it should be understood that, at certain times, at least, this wave-form may be definitely flat-topped.

When current of fault-magnitude flows through the line-current transformers 14, at either end of the protected line-section 6, it is contemplated that the sensitive fault-detector FD at that station shall respond more sensitively, that is, to weaker fault-current magnitudes, than the fault-current magnitude which is necessary to operate the tripping relay 24 or 24' in the absence of any restraining influence received from the plate-circuit of the receiver-tube R at that station. By this means, it is assured that the fault-detector FD will always operate, and initiate carrier-current transmission on alternate half-waves of a predetermined line-current function, at each end of the protected line-section at which line-current of a predetermined fault-magnitude is flowing. The transmission of carrier-current energy, on alternate half-waves of a line-current function at the transmitting end, makes available, at the outer end of the protected line-section, a received carrier-current of the same frequency, which is detected through the receiver-tube R at the other end.

In case the fault which produced the fault-current detected by the fault-detector FD is outside of the protected line-section, or, perhaps more generally stated, if the fault is beyond the far end of the protected line-section, the fault-current will enter the protected line-section at the end furthest away from the fault, and will leave the protected line-section at the end closest to the fault, and my protective apparatus will be arranged, under such circumstances, to cause the received impulses of carrier-current energy to be effective during the same half-cycles as the operating-coil impulses 94 which originate from the locally responsive circuit 22 at either station which is under consideration. This phase-relationship may be brought about by connecting the half-wave rectifier 23' in Fig. 2 in a polarity opposite to the polarity of the corresponding rectifier 23 in Fig. 1. The remotely-controlled impulses, which are received from the receiver-tube R under these conditions, are indicated at 95 in Fig. 4. Because of the current- or voltage-limiting characteristic of the receiver-tube R, the received current-impulses are square-topped or flat-topped in wave form, as indicated at 95 in Fig. 4, and the plate-voltage applied to the receiver-tube R is so correlated with the number of turns on the auxiliary coil 33 of the operating magnet 30 (Fig. 2) that the area included within each current-impulse 95 (Fig. 4) received from the receiver-tube R is substantially equal to the area included within each operating-magnet wave-impulse 94 (Fig. 4) which is obtained from the operating winding 32 (Fig. 2). These areas or integrated currents should be approximately equal, at least to the extent of not exceeding the restraining influence of the restraining winding 34 and/or a restraining spring 96 (Fig. 2), which may be connected to the rear end of the balanced beam 29 of the relay 24', so that the resultant effect of the oppositely magnetized windings 32 and 33 in Fig. 2, or the opposite current-impulses 94 and 95 in Fig. 4, is not sufficient to actuate the relay.

While I have described the oppositely energized operating-magnet windings 32 and 33 (Fig. 2) as being energized during approximately half-cycles of the predetermined line-current functions at the local end and at the remote end, respectively, of the protected line-section, I wish, by the term "approximate" to include any predetermined length of current-impulses having a predetermined ratio to the length of time-period of a half-cycle of the line-current. Thus, in the illustration given in Fig. 4, it is assumed that the carrier-current-transmitted impulses 95, which are derived from the line-currents at the remote end of the protected line-section, are not quite as long in time-duration, or not quite as large a proportion of a complete half-cycle of line-frequency current, as the current-impulses 94 which are normally received through the locally responsive relaying-circuit 22. I contemplate that any appropriate or desired ratios of the impulse-time as compared to a half-cycle period of the line-frequency current shall be included within the meaning of the word "approximately" in the expression approximately half cycles.

In case of an internal fault within the confines of the protected line-section, current of fault-magnitude will flow into the line-section at at least one end, which we will call the local end, for the time being, and this current will become evident, in the tripping relay 24' of Fig. 2, as an intermittent, unidirectionally pulsating current such as that indicated at 97 in Fig. 5, corresponding to the pulsations 94 shown in Fig. 4. At the far end of the protected line-section, if there is a sufficient source of line-frequency power connected beyond said far end, fault-current will also be delivered into the faulted line-section at said far end, and this fault-current at the far end will result in the transmission of carrier-current impulses to the local end, where the relaying equipment is being considered, in the form of intermittent pulsations such as are shown at 98 in Fig. 5. As shown, these remotely-responsive impulses 98 will be in substantial phase-opposition, or substantially 180° displaced in phase, with respect to the locally responsive impulses 97, because the fault-currents are now flowing into the protected line-section at both ends thereof, and because the half-wave rectifiers 23 and 23' at the opposite ends of the line-section are of opposite polarities.

The two opposed magnetizations of the operating magnet 30 (Fig. 2), as received from the locally responsive coil 32 and the remotely responsive coil 33, respectively, are thus displaced in time-phase from each other, so that, althouh they are in opposite directions, they come in alternate half-cycles, so that neither one opposes the other, and the relay 24' will operate during either half-cycle, depending upon which half-cycle becomes sufficiently energized first. The relay will operate in response to the externally received impulses 98, because these impulses are not offset by any simultaneous energization of the restraining magnet as shown in Fig. 3. The relay will operate in response to the locally obtained impulses 97, because these impulses are larger than the restraining-magnet impulses 92, because of the difference in the number of turns of the coils 32 and 34 in Fig. 2.

A difficulty which has required special equipment, involving undesirable complications, in many previous communicating-channel relaying-systems, has arisen in cases where there is not sufficient line-frequency power-capacity back of the faulted line-section, at one end thereof, to produce currents of fault-magnitude at that end of the protected line-section. For convenience in discussion, I shall call that end the remote end, and I shall now consider the relaying operations at the other end which I shall call the relaying end of the protected line-section. In my improved relaying system, as illustrated in the drawing, in the event of an internal fault on a line-section which has current of fault-magnitude flowing into it at the relaying end, resulting in derived unidirectional relay-operating impulses 97 (Fig. 5), if there is no line-current of fault-magnitude at the other end of the protected line-section, no remotely controlled or carrier-transmitted impulses will be received at all, so that there will neither be the in-phase opposing impulses which are shown at 95 in Fig. 4, nor the out-of-phase impulses which are shown at 98 in Fig. 5. Under these circumstances, the relay 24' will operate in the first half-cycle in which there is an impulse such as is shown at 97, said impulse being unopposed by any current received through the communicating channel from the other end of the protected line-section.

The operation of the balanced-beam relay 24' of Fig. 2, as just described, with the aid of the wave-forms shown in Figs. 3, 4 and 5, is thus essentially a current-comparing operation, comparing the locally derived impulses 94 or 97 with the impulses 95 or 98 which are received from the other end of the protected line-section. In a more definite sense, the relay 24' is a phase-comparing relay, which compares the phases of these respective undirectionally pulsating currents or impulses.

The polarized relay 24 which is shown in Fig. 1 operates in substantially the same way, in some respects, except that, in this case, the locally responsive impulses which are sent through the operating winding 26 of the polarized relay in Fig. 1 are the only impulses which can cause a response or operation of the relay. Thus, referring to Figs. 3, 4 and 5, the restraining-magnet impulses which are shown in Fig. 3 will have to be disregarded in connection with the polarized relay 24 of Fig. 1, and the locally controlled operating-magnet impulses 94 and 97 of Figs. 4 and 5 will have to be regarded as the operating forces operating on the relay, while the remotely controlled or carrier-transmitted impulses 95 and 98 will have to be regarded as restraining forces operating upon the polarized relay 24 of Fig. 1. Under these circumstances, the restraining forces do not need to be of practically the same integrated current-time value as the operating forces, as was the case in Fig. 4 as originally explained. The restraining forces 95 or 98 of a polarized relay, operating according to the form of embodiment of my invention shown in Fig. 1, would preferably be larger than the operating forces which are represented by the impulses 94 and 97 in Figs. 4 and 5, and the relay will then operate whenever there is an operating-impulse such as 94 or 97 during a quarter-cycle of time (for other operating-time of the relay) during which there is no restraining-impulse such as 95 or 98 in Figs. 4 and 5. The polarized relay 24 of Fig. 1 thus operates also as an impulse-comparing relay and more specifically, also, as a phase-comparing relay.

In certain aspects, my invention is an improvement over the protective relaying system which is described and claimed in an application of E. L. Harder, Serial No. 227,085, filed August 27, 1938, entitled Largest-phase relaying, and in other respects it is also an improvement over the protective relaying system which is described and claimed in an application of Myron A. Bostwick, Serial No. 350,658, filed August 3, 1940, for Pilot-channel protective relaying systems, both of said applications being assigned to the Westinghouse Electric & Manufacturing Company.

While I have described my invention in application to the protection of a line-section of a transmission line, and while I have shown it in an exemplary form or forms of embodiment, I wish it to be understood that my invention is susceptible of application, in general, to any alternating-current electrical apparatus which is to be protected, and that various changes may be made in the details of the form of embodiment, without departture from the more generic features of my invention. I desire, therefore, that the appended claims shall be accorded the broadest interpretation consistent with their language.

I claim as my invention:

1. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a line-current function at the relaying point for providing a first unidirectionally pulsating relaying current at said relaying point, communicating-channel means responsive approximately to alternate half-cycles of a corresponding line-current function at said other point for providing, at the relaying point, a second unidirectionally pulsating relaying current which is responsive, in some measure, to said line-current function at said other point, the unidirectional pulsations of the two unidirectionally pulsating relaying currents at said relaying point being approximately coincident in time-phase in the event of a transmission-line fault occurring beyond said other point, and electro-responsive means at the relaying point for differentially responding, in some measure, substantially exclusively to both of said unidirectionally pulsating relaying currents at said relaying point, to effect a predetermined control over the line-segregating circuit-interrupting means.

2. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a line-current function at the relaying point for providing a first unidirectionally pulsating relaying current at said relaying point, communicating-channel means responsive approximately to alternate half-cycles of a corresponding line-current function at said other point for providing, at the relaying point, a second unidirectionally pulsating relaying current which is responsive, in some measure, to said line-current function at said other point, and electro-responsive means at the relaying point for responding, in some measure, substantially exclusively to some function of the relative phases of the two unidirectionally pulsating relaying currents at said relaying point, to effect a predetermined control over the line-segregating circuit-interrupting means.

3. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a line-current function at the relaying point for providing a first unidirectionally pulsating relaying current at said relaying point, communicating-channel means responsive approximately to alternate half-cycles of a corresponding line-current function at said other point for providing, at the relaying point, a second unidirectionally pulsating relaying current which is responsive, in some measure, to said line-current function at said other point, the unidirectional pulsations of the two unidirectionally pulsating relaying currents at said relaying point being approximately coincident in time-phase in the event of a transmission-line fault occurring beyond said other point, and electro-responsive means at the relaying point for utilizing a response, in some measure, to each unidirectional pulsation of said second intermittent relaying current to provide a predetermined blocking action opposing a disconnecting operation of said circuit-interrupting means, said electro-responsive means also utilizing a response, in some measure, to each unidirectional pulsation of said first intermittent relaying current to provide a predetermined action tending to produce a circuit-opening operation of said circuit-interrupting means in the absence of said blocking action.

4. The combination, with an alternating-current transmission-line section to be protected, and line-segregating circuit-interrupting means for disconnecting the line from other apparatus, of line-fault-responsive relaying-means for actuating said line-segregating circuit interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a line-current function at the relaying point for providing a first unidirectionally pulsating relaying current at said relaying point having an approximation toward a constant magnitude over a predetermined range of line-fault severities, communicating-channel means responsive approximately to alternate half-cycles of a corresponding line-current function at said other point for providing, at the relaying point, a second unidirectionally pulsating relaying current which is responsive, in some measure, to said line-current function at said other point, said second unidirectionally pulsating relaying current also having an approximation toward a constant magnitude over a predetermined range of line-fault severities, the unidirectional pulsations of the two unidirectionally pulsating relaying currents at said relaying point being approximately coincident in time-phase in the event of a transmission-line fault occurring beyond said other point, and electro-responsive means at the relaying point for differentially responding, in some measure, to both of said unidirectionally pulsating relaying currents at said relaying point, to effect a predetermined control over the line-segregating circuit-interrupting means.

5. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a line current function at the relaying point for providing a first unidirectionally pulsating relaying current at said relaying point having an approximation toward a constant magnitude over a predetermined range of line-fault severities, communicating-channel means responsive approximately to alternate half-cycles of a corresponding line-current function at said other point for providing at the relaying point, a second unidirectionally pulsating relaying current which is responsive, in some measure, to said line-current function at said other point, said second unidirectionally pulsating relaying current also having an approximation toward a constant magnitude over a predetermined range of line-fault severities, and electro-responsive means at the relaying point for responding, in some measure, to some function of the relative phases of the two unidirectional pulsating relaying currents at said relaying point, to effect a predetermined control over the line-segregating circuit-interrupting means.

6. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point, characterized by said line-fault-responsive relaying-means including means responsive approximately to alternate half-cycles of a line-current function at the relaying point for providing a first unidirectionally pulsating relaying current at said relaying point having, at times, a somewhat flat-topped wave-form, communicating-channel means responsive approximately to alternate half-cycles of a corresponding line-current function at said other point for providing, at the relaying point, a second unidirectionally pulsating relaying current which is responsive, in some measure, to said line-current function at said other point, said second unidirectionally pulsating relaying current also having, at times, a somewhat flat topped wave-form, the unidirectional pulsations of the two unidirectionally pulsating relaying currents at said relaying point being approximately coincident in time-phase in the event of a transmission-line fault occurring beyond said other point, and electro-responsive means at the relaying point for utilizing a response, in some measure, to each unidirectional pulsation of said second intermittent relaying current to provide a predetermined blocking action opposing a disconnecting operation of said circuit-interrupting means, said electro-responsive means also utilizing a response, in some measure, to each unidirectional pulsation of said first intermittent relaying current to provide a predetermined action tending to produce a circuit-opening operation of said circuit-interrupting means in the absence of said blocking action.

7. The invention as defined in claim 1, characterized by said communicating-channel means comprising a high-frequency transmitter at said other point in the transmission line, an attuned current-limiting high-frequency receiver at said relaying point, and transmitter-controlling means at said other point for producing intermittent periods of transmission and non-transmission in response, in some measure, to said alternate half-cycles of the line-current function at said other point.

8. The invention as defined in claim 2, characterized by said communicating-channel means comprising a high-frequency transmitter at said other point in the transmission line, an attuned current-limiting high-frequency receiver at said relaying point, and transmitter-controlling means at said other point for producing intermittent periods of transmission and non-transmission in response, in some measure, to said alternate half-cycles of the line-current function at said other point.

9. The invention as defined in claim 3, characterized by said communicating-channel means comprising a high-frequency transmitter at said other point in the transmission line, an attuned current-limiting high-frequency receiver at said relaying point, and transmitter-controlling means at said other point for producing intermittent periods of transmission and non-transmission in response, in some measure, to said alternate half-cycles of the line-current function at said other point.

10. The invention as defined in claim 4, characterized by said communicating-channel means comprising a high-frequency transmitter at said other point in the transmission line, an attuned current-limiting high-frequency receiver at said relaying point, and transmitter - controlling means at said other point for producing intermittent periods of substantially unmodulated high-frequency transmission and non-transmission in response, in some measure, to said alternate half-cycles of the line-current function at said other point.

11. The invention as defined in claim 5, characterized by said communicating-channel means comprising a high-frequency transmitter at said other point in the transmission line, an attuned current-limiting high-frequency receiver at said relaying point, and transmitter - controlling means at said other point for producing intermittent periods of substantially unmodulated high-frequency transmission and non-transmission in response, in some measure, to said alternate half-cycles of the line-current function at said other point.

12. The invention as defined in claim 6, characterized by said communicating-channel means comprising a high-frequency transmitter at said other point in the transmission line, an attuned current-limiting high-frequency receiver at said relaying point, and transmitter - controlling means at said other point for producing intermittent periods of substantially unmodulated high-frequency transmission and non-transmission in response, in some measure, to said alternate half-cycles of the line-current function at said other point.

13. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line for assisting in protecting the line-section against internal faults while avoiding a line-segregating operation in the event of a transmission-line fault occurring beyond said other point; characterized by said communicating-channel means comprising a high-frequency transmitter at said other point in the transmission line, an attuned current-limiting high-frequency receiver at said relaying point, and transmitter - controlling means at said other point for producing intermittent periods of transmission and non-transmission in response, in some measure, to alternate half-cycles of a line-current function at said other point.

14. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line for assisting in protecting the line-section against internal faults while avoiding a line-segregating operation in the event of a transmission-line fault occurring beyond said other point; characterized by said communicating channel means comprising a high-frequency transmitter at said other point in the transmission line, an attuned current-limiting high-frequency receiver at said relaying point, and transmitter controlling means at said other point for producing intermittent periods of substantially unmodulated high-frequency transmission and non-transmission in response, in some measure, to alternate half-cycles of a line-current function at said other point.

15. The invention as defined in claim 1, characterized by said communicating-channel means comprising a normally non-transmitting high-frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of said line-current function at said other point, and means for subsequently producing intermittent periods of transmission and non-transmission in response, in some measure, to alternate half-cycles of said line-current function at said other point.

16. The invention as defined in claim 2, characterized by said communicating-channel means comprising a normally non-transmitting high-frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of said line-current function at said other point, and means for subsequently producing intermittent periods of transmission and non-transmission in response, in some measure, to alternate half-cycles of said line-current function at said other point.

17. The invention as defined in claim 3, characterized by said communicating-channel means comprising a normally non-transmitting high-frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of said line-current function at said other point, and means for subsequently producing intermittent periods of transmission and non-transmission in response, in some measure, to alternate half-cycles of said line-current function at said other point.

18. The invention as defined in claim 4, characterized by said communicating-channel means comprising a normally non-transmitting high-frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of said line-current function at said other point and means for subsequently producing intermittent periods of substantially unmodulated high-frequency transmission and non-transmission in response, in some measure, to said alternate half-cycles of said line-current function at said other point.

19. The invention as defined in claim 5, characterized by said communicating-channel means comprising a normally non-transmitting high-frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of said line-current function at said other point, and means for subsequently producing intermittent periods of substantially unmodulated high-frequency transmission and non-transmission in response, in some measure, to said alternate half-cycles of said line-current function at said other point.

20. The invention as defined in claim 6, characterized by said communicating-channel means comprising a normally non-transmitting high-frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of said line-current function at said other point, and means for subsequently producing intermittent periods of substantially unmodulated high-frequency transmission and non-transmission in response, in some measure, to said alternate half-cycles of said line-current function at said other point.

21. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line for assisting in protecting the line-section against internal faults while avoiding a line-segregating operation in the event of a transmission-line fault occurring beyond said other point, characterized by said communicating-channel means comprising a normally non-transmitting high frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of a line-current function at said other point, and means for subsequently producing intermittent periods of transmission and non-transmission in response, in some measure, to alternate half-cycles of said line-current function at said other point.

22. The combination, with an alternating-current transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means including communicating-channel means for obtaining a current from some other point in the transmission line for assisting in protecting the line-section against internal faults while avoiding a line-segregating operation in the event of a transmission-line fault occurring beyond said other point; characterized by said communicating-channel means comprising a normally non-transmitting high-frequency transmitter at said other point in the transmission line, an attuned current-limiting high-frequency receiver at said relaying point, and transmitter-controlling means at said other point, said transmitter-controlling means including sensitive transmitter-starting means responsive, in some measure, to both half-cycles of a line-current function at said other point, and means for subsequently producing intermittent periods of substantially unmodulated high-frequency transmission and non-transmission in response, in some measure, to alternate half-cycles of said line-current function at said other point.

23. The combination, with an alternating-current electrical apparatus to be protected, said apparatus having a first terminal where current normally enters the apparatus and a second terminal where current normally leaves the apparatus, under predetermined power-flow conditions, of fault-responsive relaying-means, means responsive approximately to alternate half-cycles of a predetermined alternating-current function of current in one of said terminals for producing a first intermittently pulsating force having force-periods each lasting for approximately a half-cycle, alternating with substantially no-force periods lasting for the remaining times between alternate half-cycles of the current-function in the associated terminal, means responsive approximately to alternate half-cycles of a corresponding alternating-current function of a current in the other terminal for producing a second intermittently pulsating force having force-periods each lasting for approximately a half-cycle, alternating with substantially no-force periods lasting for the remaining times between alternate half-cycles of the current-function in the associated terminal, the pulsations of said first and second intermittently pulsating forces being approximately in phase with each other when fault-current is flowing through the protected apparatus to some faulted point outside of the apparatus, and relay-operating means effective, in less than one-half of a cycle, to effect a predetermined relay-response in substantially exclusive response to said first and second intermittently pulsating forces when they are in a predetermined manner out of phase with each other.

24. The combination, with an alternating-current electrical apparatus to be protected, said apparatus having a first terminal where current normally enters the apparatus and a second terminal where current normally leaves the apparatus, under predetermined power-flow-conditions, of fault-responsive relaying-means, means responsive approximately to alternate half-cycles of a predetermined alternating-current function of current in one of said terminals for producing an intermittently pulsating operating-force having force-periods each lasting for approximately a half-cycle, alternating with substantially no-force periods lasting for the remaining times between alternate half-cycles of the current-function in the associated terminal, means responsive approximately to alternate half-cycles of a corresponding alternating-current function of a current in the other terminal for producing an intermittently pulsating restraining-force having force-periods each lasting for approximately a half-cycle, alternating with substantially no-force periods lasting for the remaining times between alternate half-cycles of the current-function in the associated terminal, the pulsations of said operating and restraining forces being approximately in phase with each other when fault-current is flowing through the protected apparatus to some faulted point outside of the apparatus, and relay-operating means effective, in less than one-half of a cycle, under fault-conditions, to effect a predetermined relay-response in response to said operating force when said restraining force is in a predetermined manner out of phase therewith.

25. The combination, with an alternating-current electrical apparatus to be protected, said apparatus having a first terminal where current normally enters the apparatus and a second terminal where current normally leaves the apparatus, under predetermined power-flow conditions, of fault-responsive relaying-means, means responsive sensitively to the magnitude and approximately to alternate half-cycles of a predetermined alternating-current function of current in one of said terminals for producing an intermittently pulsating restraining-force, means responsive less sensitively to the magnitude and approximately to alternate half-cycles of a corresponding alternating-current function of a current in the other terminal for producing an intermittently pulsating operating-force, said restraining and operating forces each having force-periods each lasting for approximately a half-cycle, alternating with substantially no-force periods lasting for the remaining times between alternate half-cycles of the current-function in the associated terminal, the pulsations of said restraining and operating forces being approximately in phase with each other when fault-current is flowing through the protected apparatus to some faulted point outside of the apparatus, and relay-operating means effective, in less than one-half of a cycle, to effect a predetermined relay-response in response to said operating force when said restraining force is in a predetermined manner out of phase therewith.

26. The invention as defined in claim 23, characterized by the fact that both of said intermittently pulsating forces are of an approximately limited magnitude not sensitively variable in response to the magnitudes of the currents in the respective terminals of the protected apparatus.

27. The invention as defined in claim 24, characterized by the fact that both of said intermittently pulsating forces are of an approximately limited magnitude not sensitivity variable in response to the magnitudes of the currents in the respective terminals of the protected apparatus.

28. The invention as defined in claim 25, characterized by the fact that both of said intermittently pulsating forces are of an approximately limited magnitude not sensitively variable in response to the magnitudes of the currents in the respective terminals of the protected apparatus.

29. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a predetermined phase-sequence line current function at the relaying point for providing a first unidirectionally pulsating relaying current at said relaying point, said phase-sequence function being a composite function responsive to a plurality of different kinds of line-faults, communicating-channel means responsive approximately to alternate half-cycles of a corresponding phase-sequence line-current function at said other point for providing, at said relaying point, a second unidirectionally pulsating relaying current, said two unidirectionally pulsating relaying currents each having current-impulses timed in response to the alternate half-cycles of their respective controlling line-current functions, said current-impulses being separated by intervening periods of substantially zero current, in each case, the current-impulses of the two unidirectionally pulsating relaying currents being approximately coincident in time-phase in the event of a transmission-line fault occurring beyond said other point, and electro-responsive means at the relaying point for differentially responding, in some measure, to both of said unidirectionally pulsating relaying currents at said relaying point, to effect a predetermined control over the line-segregating circuit-interrupting means.

30. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a predetermined phase-sequence line-current function at the relaying point for providing a first unidirectionally pulsating relaying current at said relaying point, said phase-sequence function being a composite function response to a plurality of different kinds of line-faults, communicating-channel means responsive approximately to alternate half-cycles of a corresponding phase-sequence line-current function at said other point for providing, at said relaying point, a second unidirectionally pulsating relaying current, said two unidirectionally pulsating relay currents each having current-impulses timed in response to the alternate half-cycles of their respective controlling line-current functions, said current-impulses being separated by intervening periods of substantially zero current, in each case, and electro-responsive means at the relaying point for responding, in some measure, to some function of the relative phases of the two unidirectionally pulsating relaying currents at said relaying point, to effect a predetermined control over the line-segregating circuit-interrupting means.

31. The combination, with a polyphase transmission-line section to be protected, and line-segregating circuit-interrupting means for disconnecting the line from other apparatus, of line-fault-responsive relaying-means for actuating said line-segregating circuit-interrupting means so as to effect a disconnecting operation; said line-fault-responsive relaying-means being of a type which utilizes a current obtained from some other point in the transmission line for assisting in protecting the line-section against internal faults while avoiding a line-segregating operation in the event of a transmission-line fault occurring beyond said other point; characterized by said line-fault-responsive relaying-means including means responsive approximately to alternate half-cycles of a predetermined phase-sequence line-current function at the relaying point for providing a first unidirectionally pulsating relaying current at said relaying point, said phase-sequence function being a composite function responsive to a plurality of different kinds of line-faults, communicating-channel means responsive approximately to alternate half-cycles of a corresponding phase-sequence line-current function at said other point for providing, at said relaying point, a second unidirectionally pulsating relaying current, said two unidirectionally pulsating relaying currents each having current-impulses timed in response to the alternate half-cycles of their respective controlling line-current functions, said current-impulses being separated by intervening periods of substantially zero current, in each case, the current-impulses of the two unidirectionally pulsating relay currents being approximately coincident in time-phase in the event of a transmission-line fault occurring beyond said other point, and electro-responsive means at the relaying point for utilizing a response, in some measure, to each unidirectional pulsation of said second intermittent relaying current to provide a predetermined blocking action opposing a disconnecting operation of said circuit-interrupting means, said electro-responsive means also utilizing a response, in some measure, to each unidirectional pulsation of said first intermittent relaying current to provide a predetermined action tending to produce a circuit-opening operation of said circuit-interrupting means in the absence of said blocking action.

32. The invention as defined in claim 29, characterized by the fact that both of said relaying currents have an approximation toward a constant magnitude over a predetermined range of line-fault severities.

33. The invention as defined in claim 30, characterized by the fact that both of said relaying currents have an approximation toward a constant magnitude over a predetermined range of line-fault severities.

34. The invention as defined in claim 31, characterized by the fact that both of said relaying currents have an approximation toward a constant magnitude over a predetermined range of line-fault severities.

35. The combination, with a polyphase electrical apparatus to be protected, said apparatus having a first terminal where polyphase current normally enters the apparatus and a second terminal where polyphase current normally leaves the apparatus, under predetermined power-flow conditions, of fault-responsive relaying-means, means responsive approximately to alternate half-cycles of a predetermined phase-sequence function of polyphase current in one of said terminals for producing a first intermittently pulsating force having force-periods each lasting for approximately a half-cycle, alternating with substantially no-force periods lasting for the remaining times between alternate half-cycles of the current-function in the associated terminal, means responsive approximately to alternate half-cycles of a corresponding phase-sequence function of polyphase current in the other terminal for producing a second intermittently pulsating force having force-periods each lasting for approximately a half-cycle, alternating with substantially no-force periods lasting for the remaining times between alternate half-cycles of the current-function in the associated terminal, the pulsations of said first and second intermittently pulsating forces being approximately in phase with each other when fault-current is flowing through the protected apparatus to some faulted point outside of the apparatus, and relay-operating means effective, in less than one-half of a cycle, to effect a predetermined relay-response in response to said first and second intermittently pulsating forces when they are in a predetermined manner out of phase with each other.

36. The combination, with a polyphase electrical apparatus to be protected, said apparatus having a first terminal where polyphase current normally enters the apparatus and a second terminal where polyphase current normally leaves the apparatus, under predetermined power-flow conditions, of fault-responsive relaying-means, means responsive approximately to alternate half-cycles of a predetermined phase-sequence function of polyphase current in one of said terminals for producing an intermittently pulsating operating-force having force-periods each lasting for approximately a half-cycle, alternating with substantially no-force periods lasting for the remaining times between alternate half-cycles of the current-function in the associated terminal, means responsive approximately to alternate half-cycles of a corresponding phase-sequence function of polyphase current in the other terminal for producing an intermittently pulsating restraining-force having force-periods each lasting for approximately a half-cycle, alternating with substantially no-force periods lasting for the remaining times between alternate half-cycles of the current-function in the associated terminal, the pulsations of said operating and restraining forces being approximately in phase with each other when fault-current is flowing through the protected apparatus to some faulted point outside of the apparatus, and relay-operating means effective, in less than one-half of a cycle, under fault-conditions, to effect a predetermined relay-response in response to said operating force when said restraining force is in a predetermined manner out of phase therewith.

37. The combination, with a polyphase electrical apparatus to be protected, said apparatus having a first terminal where polyphase current normally enters the apparatus and a second terminal where polyphase current normally leaves the apparatus, under predetermined power-flow conditions, of fault-responsive relaying-means, means responsive sensitively to the magnitude and approximately to alternate half-cycles of a predetermined phase-sequence function of polyphase current in one of said terminals for producing an intermittently pulsating restraining-force, means responsive less sensitively to the magnitude and approximately to alternate half-cycles of a corresponding phase-sequence function of polyphase current in the other terminal for producing an intermittently pulsating operating-force, said restraining and operating forces each having force-periods each lasting for approximately a half-cycle, alternating with substantially no-force periods lasting for the remaining times between alternate half-cycles of the current-function in the associated terminal, the pulsations of said restraining and operating forces being approximately in phase with each other when fault-current is flowing through the protected apparatus to some faulted point outside of the apparatus, and relay-operating means effective, in less than one-half of a cycle, to effect a predetermined relay-response in response to said operating force when said restraining force is in a predetermined manner out of phase therewith.

38. The invention as defined in claim 35, characterized by the fact that both of said intermittently pulsating forces are of an approximately limited magnitude not sensitively variable in response to the magnitudes of the currents in the respective terminals of the protected apparatus.

39. The invention as defined in claim 36, characterized by the fact that both of said intermittently pulsating forces are of an approximately limited magnitude not sensitively variable in response to the magnitudes of the currents in the respective terminals of the protected apparatus.

40. The invention as defined in claim 37, characterized by the fact that both of said intermittently pulsating forces are of an approximately limited magnitude not sensitively variable in response to the magnitudes of the currents in the respective terminals of the protected apparatus.

SHIRLEY L. GOLDSBOROUGH.